United States Patent

Heizmann et al.

[11] Patent Number: 6,108,054
[45] Date of Patent: Aug. 22, 2000

[54] METHOD AND APPARATUS FOR OBTAINING CORRECTION VALUES FOR VIDEO LINES OF A VIDEO FRAME

[75] Inventors: Friedrich Heizmann; Günter Gleim, both of Villingen-Schwenningen, Germany

[73] Assignee: Deutsche Thomson Brandt GmbH, Villingen-Schwenningen, Germany

[21] Appl. No.: 08/896,641

[22] Filed: Jul. 18, 1997

[30] Foreign Application Priority Data

Aug. 9, 1996 [DE] Germany ............... 196 32 188

[51] Int. Cl.[7] ............................................. H04N 7/00
[52] U.S. Cl. ............................................... 348/745
[58] Field of Search .......................... 348/745, 746, 348/747, 806, 807, 190, 191

[56] References Cited

U.S. PATENT DOCUMENTS

| | | | |
|---|---|---|---|
| 4,977,355 | 12/1990 | Rodriguez-cavazos | 348/745 |
| 5,075,623 | 12/1991 | Matsuda | 324/250 |
| 5,345,280 | 9/1994 | Kimura | 348/745 |
| 5,432,543 | 7/1995 | Hasegawa | 348/65 |
| 5,537,159 | 7/1996 | Suematsu | 348/745 |
| 5,627,605 | 5/1997 | Kim | 348/745 |
| 5,694,181 | 12/1997 | Oh | 348/807 |
| 5,793,447 | 8/1998 | Fujiwara | 348/807 |
| 5,969,365 | 10/1999 | Takemoto | 250/491 |

FOREIGN PATENT DOCUMENTS

| | | |
|---|---|---|
| 0689363 A2 | 12/1995 | European Pat. Off. . |
| 63-221788 | 9/1988 | Japan . |
| 2-154593 | 6/1990 | Japan . |
| 7-67123 | 3/1995 | Japan . |
| 8-23545 | 1/1996 | Japan . |
| 8-9405 | 1/1996 | Japan . |

*Primary Examiner*—Mark R. Powell
*Assistant Examiner*—Wesner Sajous
*Attorney, Agent, or Firm*—Joseph S. Tripoli; Joseph J. Laks; Harvey D. Fried

[57] ABSTRACT

A method and apparatus for obtaining correction values for convergence setting in video projection devices includes calculating the correction values for the individual video lines at least in part by interpolation between correction interpolation point values. The correction interpolation point values are in this case distributed in the form of a grid over the screen area of the video projection device. During the calculation of correction values for the video lines of a first field of the video frame, a respective set of two intermediate or final values for the interpolation is calculated, which set is applicable to neighbouring lines in different video fields, but in each case only one intermediate or final value is used for the convergence correction in the current video line. As a result, optimal convergence correction can be set for each video line without a high memory outlay and without high computing complexity.

8 Claims, 5 Drawing Sheets

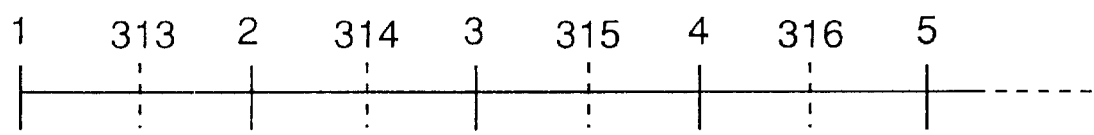
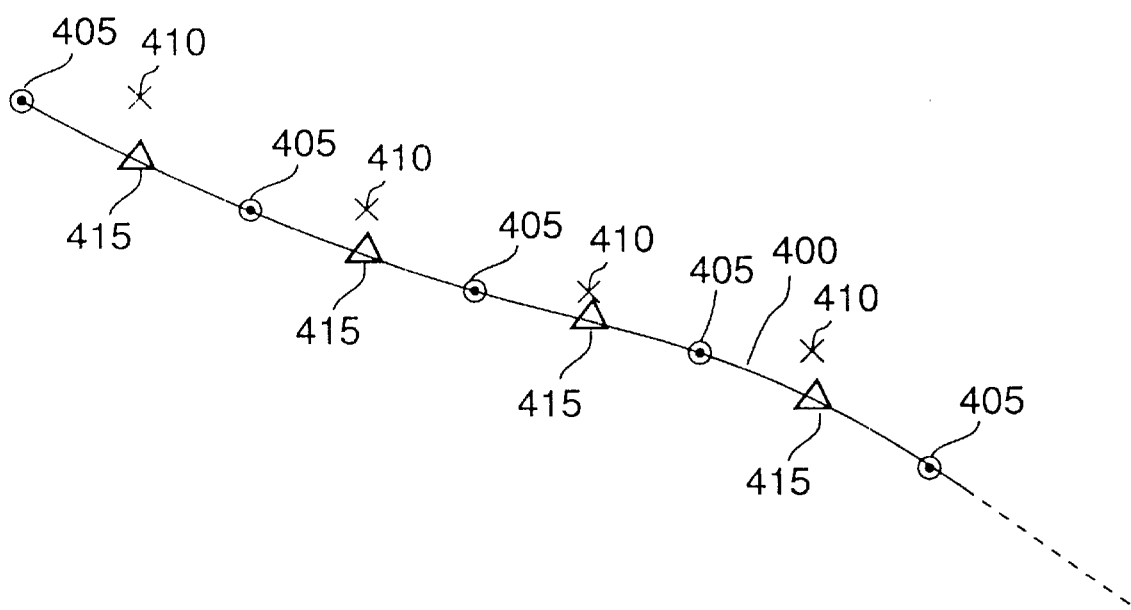
Fig.3

| | (W) | (K) | (L) | (M) | (P) | (Q) | (V) | |
|---|---|---|---|---|---|---|---|---|
| W0 ─── 300 | W0 | 0/1 | 0/1 | 0/9 | 0 | a | b | $U1= W+(K+1)/2 \cdot Q+(M \cdot Q+L \cdot V)/(2 \cdot Z)$ |
| | W0 | 2/3 | 3/6 | 17/24 | 0 | a | b | $U2= W+(K+1)/2 \cdot Q+(M \cdot Q+L \cdot V)/(2 \cdot Z)$ |
| a | W0 | 4/5 | 10/15 | 30/35 | 0 | a | b | $U3= W+(K+1)/2 \cdot Q+(M \cdot Q+L \cdot V)/(2 \cdot Z)$ |
| | W0 | 6/7 | 21/28 | 39/42 | 0 | a | b | $U4= W+(K+1)/2 \cdot Q+(M \cdot Q+L \cdot V)/(2 \cdot Z)$ |
| | W0 | 8/9 | 36/45 | 44/45 | 0 | a | b | $U5= W+(K+1)/2 \cdot Q+(M \cdot Q+L \cdot V)/(2 \cdot Z)$ |
| W1 ─── 301 | W1 | 0/1 | 0/1 | 0/9 | a | b | c | $U6= W+(-\beta+M) \cdot P+((\alpha+Z \cdot K) \cdot Q+L \cdot V)/(2 \cdot Z)$ |
| | W1 | 2/3 | 3/6 | 17/24 | a | b | c | $U7= W+(-\beta+M) \cdot P+((\alpha+Z \cdot K) \cdot Q+L \cdot V)/(2 \cdot Z)$ |
| b | W1 | 4/5 | 10/15 | 30/35 | a | b | c | $U8= W+(-\beta+M) \cdot P+((\alpha+Z \cdot K) \cdot Q+L \cdot V)/(2 \cdot Z)$ |
| | W1 | 6/7 | 21/28 | 39/42 | a | b | c | $U9= W+(-\beta+M) \cdot P+((\alpha+Z \cdot K) \cdot Q+L \cdot V)/(2 \cdot Z)$ |
| | W1 | 8/9 | 36/45 | 44/45 | a | b | c | $U10= W+(-\beta+M) \cdot P+((\alpha+Z \cdot K) \cdot Q+L \cdot V)/(2 \cdot Z)$ |
| W2 ─── 302 | W2 | 0/1 | 0/1 | 0/9 | b | c | d | $U11= W+(-\beta+M) \cdot P+((\alpha+Z \cdot K) \cdot Q+L \cdot V)/(2 \cdot Z)$ |

⋮

| | | | | | | | | |
|---|---|---|---|---|---|---|---|---|
| W10 ─── 305 | W10 | 0/1 | 0/1 | 0/9 | j | k | l | $U51= W+((-\beta+M) \cdot P+((\alpha+Z \cdot K) \cdot Q+L \cdot V)/(2 \cdot Z)$ |
| | W10 | 2/3 | 3/6 | 17/24 | j | k | l | $U52= W+((-\beta+M) \cdot P+((\alpha+Z \cdot K) \cdot Q+L \cdot V)/(2 \cdot Z)$ |
| k | W10 | 4/5 | 10/15 | 30/35 | j | k | l | $U53= W+((-\beta+M) \cdot P+((\alpha+Z \cdot K) \cdot Q+L \cdot V)/(2 \cdot Z)$ |
| | W10 | 6/7 | 21/28 | 39/42 | j | k | l | $U54= W+((-\beta+M) \cdot P+((\alpha+Z \cdot K) \cdot Q+L \cdot V)/(2 \cdot Z)$ |
| | W10 | 8/9 | 36/45 | 44/45 | j | k | l | $U55= W+((-\beta+M) \cdot P+((\alpha+Z \cdot K) \cdot Q+L \cdot V)/(2 \cdot Z)$ |
| W11 ─── 306 | W11 | 0/1 | 0/1 | 0/9 | k | l | 0 | $U56= W+((-\beta+M) \cdot P+(\alpha+Z \cdot K+L) \cdot Q)/(2 \cdot Z)$ |
| | W11 | 2/3 | 3/6 | 17/24 | k | l | 0 | $U57= W+((-\beta+M) \cdot P+(\alpha+Z \cdot K+L) \cdot Q)/(2 \cdot Z)$ |
| l | W11 | 4/5 | 10/15 | 30/35 | k | l | 0 | $U58= W+((-\beta+M) \cdot P+(\alpha+Z \cdot K+L) \cdot Q)/(2 \cdot Z)$ |
| | W11 | 6/7 | 21/28 | 39/42 | k | l | 0 | $U59= W+((-\beta+M) \cdot P+(\alpha+Z \cdot K+L) \cdot Q)/(2 \cdot Z)$ |
| | W11 | 8/9 | 36/45 | 44/45 | k | l | 0 | $U60= W+((-\beta+M) \cdot P+(\alpha+Z \cdot K+L) \cdot Q)/(2 \cdot Z)$ |
| W12 ─── 307 | W12 | 0/1 | 0/1 | 0/9 | l | 0 | 0 | $U61= W+((-\beta+\alpha) \cdot P+\alpha \cdot P)/(2 \cdot Z)$ |

$Z=10$ ; $\quad a=(W1-W0)/Z$ ; $b=(W2-W1)/Z$ $k=(W11-W10)/Z$ ; $l=(W12-W11)/Z$ $\alpha=(Z^2+Z)/2 \qquad ; \qquad \beta=((Z-1)^2+(Z-1))/2$

Fig.4

|  | (K) | (L) | (M) |
|---|---|---|---|
| WO ─── 300 | 0 | 0 | 0 |
|  |  | 1 | 9 |
| ─ ─ ─ ─ ─ | 1 | 1 | 9 |
| a {  |  | 2 | 8 |
| ─────── | 2 | 3 | 17 |
|  |  | 3 | 7 |
| ─ ─ ─ ─ ─ | 3 | 6 | 24 |
|  |  | 4 | 6 |
| ─────── | 4 | 10 | 30 |
|  |  | 5 | 5 |
| ─ ─ ─ ─ ─ | 5 | 15 | 35 |
|  |  | 6 | 4 |
| ─────── | 6 | 21 | 39 |
|  |  | 7 | 3 |
| ─ ─ ─ ─ ─ | 7 | 28 | 42 |
|  |  | 8 | 2 |
| ─────── | 8 | 36 | 44 |
|  |  | 9 | 1 |
| ─ ─ ─ ─ ─ | 9 | 45 | 45 |
| ─── 301 |  |  |  |
| ─────── | 0 | 0 | 0 |
| ⋮ | ⋮ | ⋮ | ⋮ |

Fig.5

METHOD AND APPARATUS FOR OBTAINING CORRECTION VALUES FOR VIDEO LINES OF A VIDEO FRAME

BACKGROUND OF THE INVENTION

The invention relates to a method and an apparatus for obtaining correction values for video lines of a video frame, in particular for convergence setting in video projection devices.

DESCRIPTION OF THE PRIOR ART

The invention is based on a method for obtaining correction values for convergence setting in a video correction device of the generic type of the independent claim 1. A method for obtaining correction values for convergence setting in video projection devices has already been disclosed in EP 0 689 363 A2. The disclosure of the latter, in the case of a video projection device, is to provide a grid network for the screen area and to store correction interpolation point values in a memory. The correction interpolation point values are in each case determined exactly for the points of intersection of the grid lines. During operation of the video projection device, the correction interpolation point values are then read out in synchronism with the movement of the electron beams of the three projection tubes. Digital/analog conversion then produces the associated correction voltages for the projection tubes. Further correction values are determined beween two correction interpolation point values in the vertical direction by means of vertical interpolation between the correction interpolation point values. The vertical interpolator described therein carries out linear interpolation between two correction interpolation point values of the grid network. In addition, a static correction value is also added to the respective interpolation result. This static correction value serves to compensate for static influences such as, for example, the strength of the earth's magnetic field at the installation site, etc. In addition, two further correction values are also provided. These two further correction values serve the purpose of generating a constant spacing between the neighbouring video lines of a video frame under convergence. For this purpose, different offset values, depending on whether a video line of the first field or of the second field is involved, are additionally added to the correction values, which are stored in different memories.

BRIEF SUMMARY OF THE INVENTION

The object of the invention is to specify a method for obtaining the correction values for convergence setting in video projection devices which takes sufficient account of the special nature of the offset of the video lines of the first field compared with the video lines of the second field.

The method according to the invention, having the features of claim 1, has the advantage over the method disclosed in the prior art that only a low computational complexity and a low memory outlay are caused for the interpolation. The picture quality is increased even further by virtue of the fact that a respective set of two intermediate or final values is jointly calculated for the determination of the correction value of a video line, one intermediate or final value being applicable to the current video line of a first field and the other intermediate or final value being applicable to the corresponding video line of a second field of the video frame, and that in each case that intermediate or final value which is applicable to the current video line of the current field is selected for the purpose of correction. The chip area required in an integrated circuit for realizing this interpolation algorithm remains small in comparison with other solutions.

The fact that, during the calculation of the correction values for video lines of the first field and of the second field, the same correction interpolation point values are used in each case, but different intermediate or final values are used in each case, means that the memory outlay for the correction interpolation point values remains low and, nevertheless, the position of the respective video line on the screen can optimally be taken into account in both fields.

In one case, the final value constitutes the correction value calculated according to the interpolation algorithm. As an alternative, it is also possible to calculate only one intermediate value, which must then also be inserted into the interpolation formula.

It is very advantageous for the computing algorithm if, during the calculation of a correction value for a video line, in each case at least one weighting value for two neighbouring video lines on the screen is calculated as the intermediate value, the two video lines belonging to different fields of the video frame and corresponding to one another. Only the respective weighting value which is applicable to the current video line is then used for the interpolation. The computing steps then appear virtually identical in both fields; it is only necessary to select, for example with the aid of a video line counter, which of the weighting values must be used for the current video line.

Advantageous measures for an apparatus for obtaining correction values for convergence setting in video projection devices are specified in the Claims.

BRIEF DESCRIPTION OF THE DRAWINGS

Exemplary embodiments of the invention are illustrated in the drawings and are explained in more detail in the description below.

In the figures:

FIG. 3 shows a graphical illustration of the problem regarding the different position of video lines in the first and second fields of a video frame;

FIG. 4 shows a flow diagram for an interpolation method according to the invention;

FIG. 5 shows a more detailed illustration of the calculation of the weighting values for the interpolation method according to the invention.

DETAILED DESCRIPTION OF THE INVENTION

Figure 1:
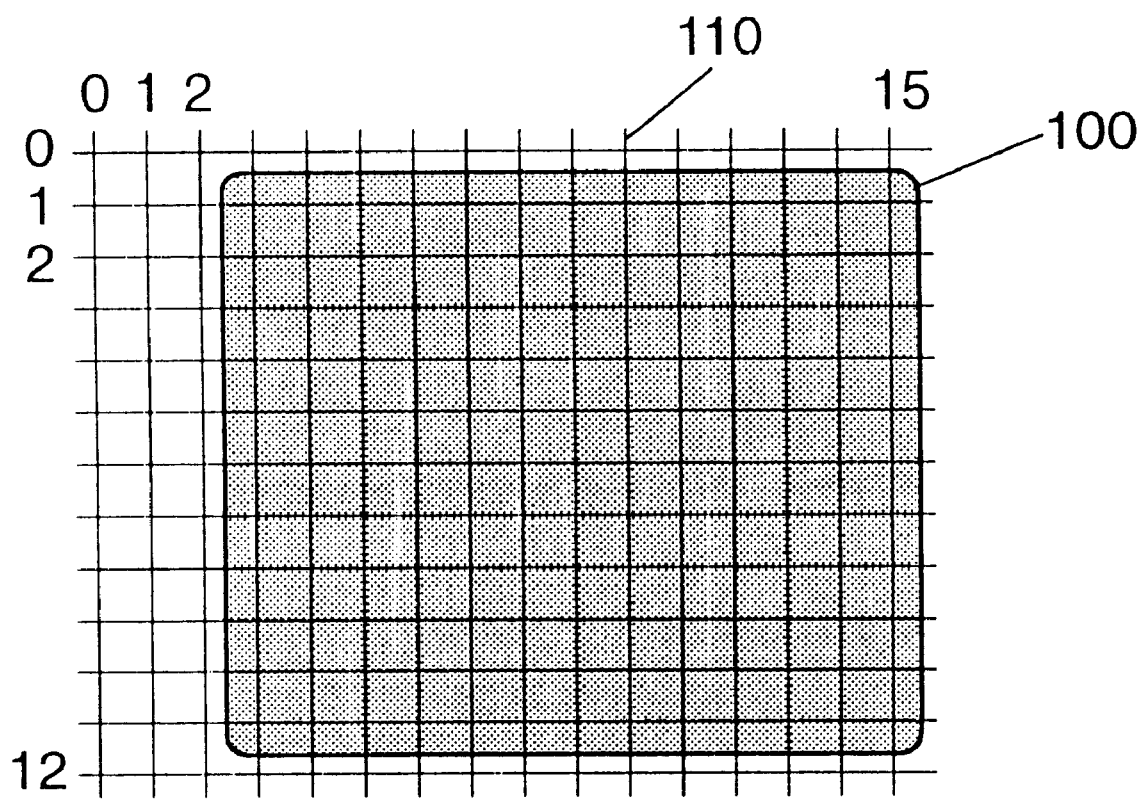
FIG. 1 shows the screen area of a video projection device and, placed over it, a grid network for graduation.
Figure 2:
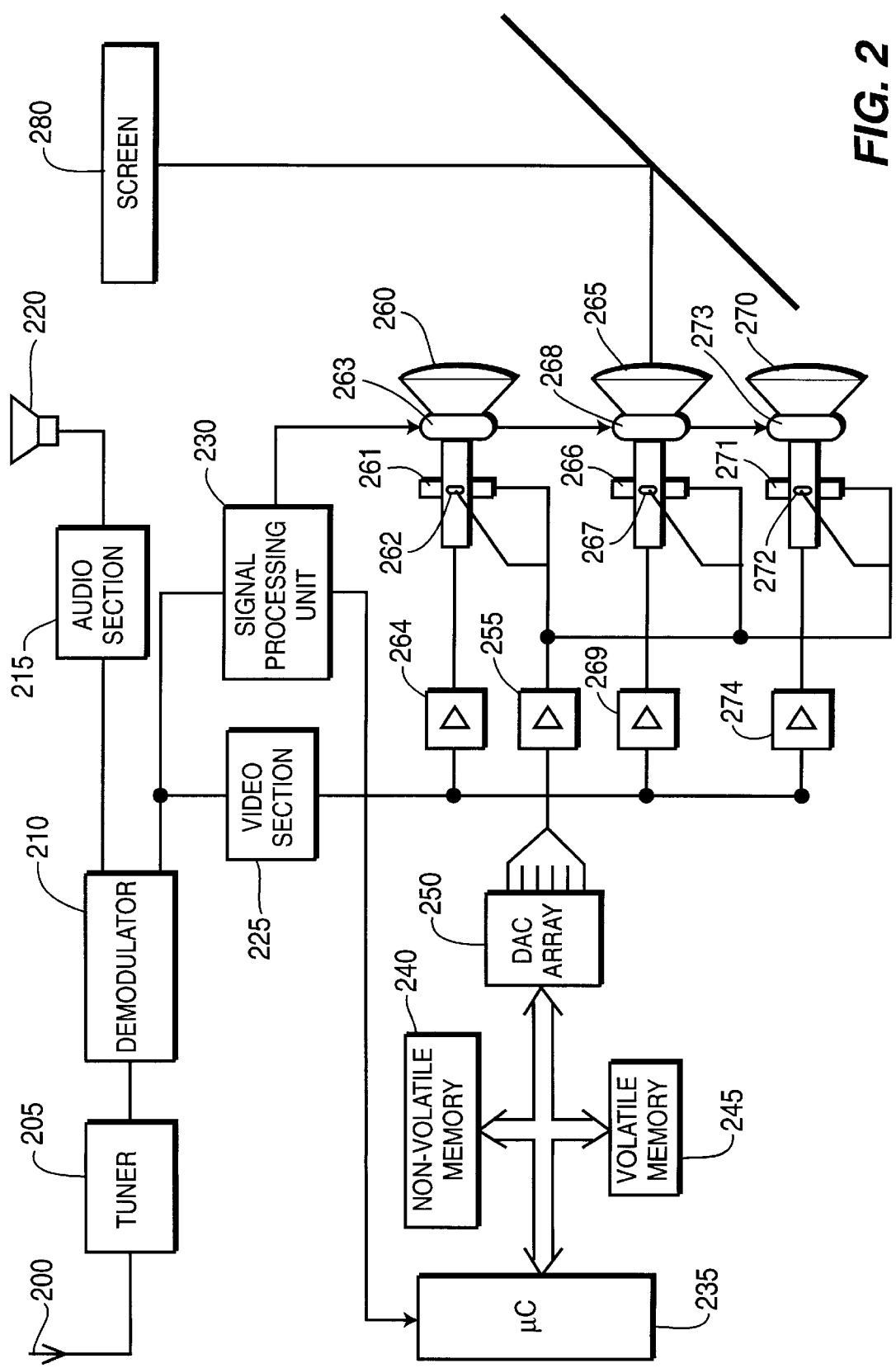
FIG. 2 shows a block diagram of a video projection device.

In FIG. 1, the reference number 100 designates the visible picture area of a video projection device. The reference number 110 designates a grid network which is placed over the picture area. This grid network is placed over the screen area only for the purpose of convergence setting for the video protection device. It is invisible during normal operation of the projection device. The horizontal grid network lines of the grid network are numbered through from 0–12. The vertical grid network lines of the grid network are numbered through from 0–15. For the purpose of convergence correction, a correction interpolation point value is respectively stored for each colour red, green, blue at the crossover points of the grid lines. In this case, respectively different correction interpolation point values are stored for the horizontal convergence correction and the vertical convergence correction. In other words, for each grid line crossover point, six different correction interpolation point values are stored in a memory of the video projection device. The general principle of convergence correction for video projection devices is explained in more detail below with reference to the block diagram in FIG. 2.

The reference number 200 designates the antenna for the video projection device. The antenna signal is directed to a tuning unit 205. The audio signals and the video signal are separated from one another in a demodulator circuit 210. The audio signals are fed to the audio section 215. The corresponding audio section 215 outputs the signals generated to the loudspeaker 220. The video signals are processed in a separate video section 225. The signals for horizontal and vertical deflection are processed in a separate signal processing unit 230. The video signals generated are passed via separate amplifiers 264, 269 and 274 to the three projection tubes 260, 265 and 270. In a corresponding manner, the signals for horizontal and vertical deflection are also forwarded to the deflection units 263, 268 and 273 of the projection tubes. The radiated light of the projection tubes 260, 265 and 270 is imaged via a deflection mirror 275 onto a screen 280. For convergence correction, the signals for horizontal and vertical deflection are fed to a computing unit 235. The computing unit 235 is connected via a corresponding data bus to a non-volatile memory 240 and a volatile memory 245. An EPROM module may be provided, for example, as the non-volatile memory 240. A RAM module can be used as the volatile memory. The computing unit 235 is likewise connected via the data bus to a digital/analog converter array 250. This array contains six digital/analog converters. Six correction voltages are correspondingly present at the outputs of the D/A converter array. The six correction voltages are directed via an amplifier unit 255 to the six correction coils 261, 262, 266, 267, 271, 272 of the three projection tubes. The correction coils 261, 266 and 271 are used for vertical convergence correction. The correction coils 262, 267 and 272 are used for horizontal convergence correction.

The correction interpolation point values are stored in the non-volatile memory 240, as already explained above in the description of FIG. 1. In synchronism with the profile of the horizontal and vertical deflection signals, the computing unit 235 selects the suitable correction interpolation point values and carries out the necessary vertical interpolation with the associated vertical and/or horizontal correction interpolation point values. In this case, the computing results are stored in the volatile memory 245. The results determined are then each output to the associated D/A converter. Of course, the correction values must be available with correct timing, so that the correct correction voltages are always present at the associated correction coils.

With regard to further details on the digital convervence correction, reference is made to the applicant's still unpublished German patent application with the application Ser. No.196 11 059.9. Further details on the interpolation method for the vertical direction are specified therein. This method makes it possible to place the interpolation curve smoothly through the correction interpolation point values. Five exemplary embodiments of suitable interpolation methods are explained in detail therein. Indications regarding convergence correction in the horizontal direction are also contained in the patent application.

The problem which arises during interpolation in the vertical direction on account of the line offset of the lines of the first field and the corresponding lines of the second field is explained in more detail below with reference to FIG. 3. The upper part of FIG. 3 illustrates the number of video lines of the video frame. The first five video lines of the video frame are marked with vertical lines. Between these lines, the first five lines of the second field of the video frame are illustrated by dashed lines. It is assumed here that a video frame consists of 625 visible lines. This assumption represents a simplification of existing television standards in which a specific number of lines are transmitted as invisible lines at the beginning and at the end of a frame. In such cases, the examplary embodiment would then have to be adapted correspondingly. Of course, a different line division can also be considered. Likewise, the method can be employed in the case of television standards where more or fewer than 625 lines are used.

The first field consists of lines 1 to 312 and the second field consists of lines 313–625. The numbering of the video lines above FIG. 3 is indicated by numerals. In the lower part of FIG. 3, the reference number 400 designates the ideal interpolation curve for convergence correction for the illustrated position in the frame. The reference number 405 designates interpolation values which lie virtually exactly on the ideal interpolation curve and have been determined by means of the interpolation method, which will be described in more detail below, for the first five video lines of the first field. It is assumed here that the first correction interpolation point value for the first video line with the numeral 1 is stored in the memory and the second correction interpolation point value, for example for the twentysixth video line of the first field, is stored in the memory. Consequently, the first interpolation value 405 below the first video line corresponds to the first correction interpolation point value, and the remaining interpolation values 405 relate to interpolation results for the corresponding video lines.

If the same interpolation method is now employed in the second field without any alteration, then the interpolation results no longer lie exactly on the ideal interpolation curve 400. The associated values are designated by the reference 410 in FIG. 3. On account of the fact that the interpolation values would now be used at a different point in the frame for convergence correction, slight correction errors are therefore produced which can have an adverse effect on the picture quality. The ideal interpolation values, which are calculated by the interpolation method according to the invention, have been designated by the reference numeral 415 for the video lines of the second field. These values once again largely lie on the ideal interpolation curve. The interpolation method according to the invention is explained in more detail below in connection with FIG. 4.

The exemplary embodiment in accordance with FIG. 4 is derived from the exemplary embodiment in FIG. 13 of the applicant's German patent application with the application Number 196 11 059.9. In this regard, therefore, reference is once again expressly made to the patent application cited. The left-hand part of FIG. 4 illustrates the video lines of a video frame at a horizontal position of the frame. The video lines of the first field are illustrated by a solid line. The video lines of the second field are illustrated by dashed lines. Bold type emphasizes those video lines 300–307 for which correction interpolation point values are stored in the memory 240 of the video projection device. The individual correction interpolation point values, for example for vertical convergence correction, are provided with the reference symbols W0–W12. An interval consists of two correction interpolation point values. It thus consists of 5 video lines of the first field and 5 respective video lines of the second field. This example represents a simplification. Such a correction interpolation point interval would really be formed by 26 video lines of the first field and 26 video lines of the second field for a 625-line frame.

For the interpolation, so-called correction step values (a–1) are determined by linear interpolation between two correction interpolation point values. The associated calculation formula is respectively indicated below the figure. In this case, the number Z designates the number of video lines of the interpolation interval. In this example illustrated, Z=10. The calculation formula for the interpolation result is in each case indicated on the right next to the illustrated video line of the first field. They are the formulae for the expressions U1–U61. Except in the first and last interpolation intervals, the calculation formula for the individual video lines is always the same. The calculation formulae of different natures for the video lines in the first and last interpolation intervals serve to elevate the correction values at the edge of the frame. This problem has been explained in detail in the applicant's parallel German patent application mentioned above. It is therefore not discussed in detail again at this point. What is critical, on the other hand, is how the weighting values (K, L, M) for the three respective correction step values which influence the interpolation calculation for a video line are calculated.

Let us consider the second interpolation interval as an example. This interval is bounded by the correction interpolation point values W1 and W2. During the calculation of the correction value for a video line within this current interval, use is made of the correction step values a for the preceding interval, b for the current interval and c for the succeeding interval. The case which is specified for calculating the seventh video line of the video frame is considered as an example. In the calculation formula U7, the left-hand value 17 which is specified under column M is then selected as weighting factor for the correction step value a. Correspondingly, the value 2 which is specified under column K is selected as weighting value for the correction step value b. Accordingly, the value 3 which is specified under column L is inserted into the formula U7 as weighting value for the correction step value c. It should also be mentioned that the actual weighting values are not only determined by the specified quantities (K, L, M), rather the constants &✓, ✕, Z also influence the calculation of the weighting values. However, for the sake of simplicity, the discussion below will always state that the weighting values are determined by the values (K, L, M). This is also essentially correct because only these quantities are variable and the other quantities mentioned enter as constants into the calculation of the actual weighting value.

As explained above, the respective left-hand value in the columns for the weighting values (K, L, M) was used for the calculation of the correction value for the seventh video line. If a correction value for the seventh video line of the second field is then to be calculated, then the formula U7 is likewise used once again for the calculation, but this time the numbers on the right under the respective column are used as quantities for the weighting factors (K, L, M). The effect achieved in this way is that in each case different values are used as weighting values for the interpolation calculation, with the result that the position of the respective video line in the frame is automatically taken correctly into account.

FIG. 5 illustrates how the individual values for the weighting factors (K, L, M) are produced. The video lines for the first interpolation interval are once again indicated in FIG. 5. The two correction interpolation point values W0 and W1 are indicated as a reference. The weighting value (K) is produced for the respective video line by simple incrementation of a counter from 0–9. The weighting factor (L) is produced by progressive addition of an incremented value (1–9) to the respectively preceding value. The weighting factor (M) is produced in each case by progressive addition of a decremented value (9–1) to the preceding value. This can easily be discerned with reference to the columns (K, L, M) in FIG. 5.

The values K, L, M illustrated for the first interpolation interval are repeated for the following interpolation intervals and remain unchanged as a result.

It should also be mentioned that only after mathematical transformation of the calculation formulae U1–U61 does it become possible to discern that the influence of the correction step value of the preceding interpolation interval becomes weaker as the distance of the current video line from the preceding interpolation interval increases, and, in contrast, the influence of the correction step value for the succeeding interval becomes greater as the distance of the current video line from the preceding interval increases. In addition, only then is it possible to discern that the influence of the correction step value of the current interval is kept constant within the current interval. In this regard, reference is also made to FIG. 11 in the applicant's parallel German patent application already mentioned above, where an example is given which, after mathematical transformation, illustrates the correlation just mentioned. In the exemplary embodiment illustrated here, a line counter 236, which can also be realized as a software counter, is used as a decision criterion as to which of the numbers respectively specified under the columns for the weighting values (K, L, M) is inserted into the adjacent calculation formula on the right. If the counter reading of the line counter 236 lies within the range from 1–312, in each case the left-hand numerical value specified in the columns for the weighting values (K, L, M) is inserted into the calculation formula. If the counter reading is in the range from 313–625, then the right-hand number is in each case inserted into the calculation formula. The line counter 236 is illustrated in computing unit 235 in FIG. 2.

The interpolation method which has been illustrated can be modified in a great many ways. In the method illustrated, an exemplary embodiment with the following parameters was selected:

1. The grid interval is 5 lines per field.
2. 12 interpolation intervals were selected.
3. The neighbouring zones were influenced in the entire area.
4. The correction step values from a preceding zone and a succeeding zone were used for a current zone.
5. The incrementation and decrementation for calculating weighting factors from the neighbouring zones were carried out linearly.

All five variables can be varied independently of one another. The formulae must then be adapted correspondingly. In particular, it is also to be regarded as within the scope of the invention when the correction step value of the preceding zone is taken into account only in the calculation of the interpolation values in an upper part of the current grid zone, or the correction step value of the succeeding grid zone is taken into account only in the calculation of the interpolation values in a lower part of the current grid zone.

Of course, a subdivision other than into upper and lower parts of the current grid zone can also be used.

Furthermore, it is also possible, for example, to use more than only three involved grid zones for the interpolation calculation.

For weighted interpolation it is also possible to use so-called matching methods, in which a curve is placed through the correction interpolation point values. A method of this type is the least mean square error method, for example. As an alternative, reference is also made to curve matching with the aid of spline functions, for example cubic spline functions. In these examples, respective interpolation values for two neighbouring video lines are then jointly calculated, but only one of them is used for the correction, as explained above. In this case, only one final value is then calculated for each video line of the two neighbouring video lines in the two fields, and not three intermediate values K, L, M as in the preceding exemplary embodiment. Both examples are to be regarded as within the scope of the invention.

What is claimed is:

1. Method for obtaining correction values for video lines of a video frame, in particular for convergence setting in a video projection device, comprising the steps of:

defining interpolation intervals between each adjacent pair of a plurality of original values being distributed in the form of a grid over the screen area of the video projection device;

calculating correction values for the video lines at least in part by means of interpolation within each said interpolation interval;

calculating a respective set of two intermediate or final values during the calculation of the correction value for a current video line, one intermediate or final value being applicable to a video line of a first field and the other intermediate or final value being applicable to the corresponding video line of a second field of the video frame;

selecting in each case that intermediate or final value which is applicable to the current video line of the current field for the purpose of correction;

performing a weighted combination of correction step values during the interpolation wherein the intermediate value in each case constitutes at least one weight coefficient for the interpolation calculation;

calculating a correction step value for a respective interpolation interval by linear interpolation within said interpolation interval; and calculating the correction values in a current interval based upon said correction step values for said current interpolation interval and for interpolation intervals before and after said current interpolation interval.

2. Method according to claim 1, in which the respective final value constitutes the correction value for the respective video line.

3. Method according to claim 1, further comprising the step of weighting the correction step values of said interpolation intervals before and after said current interpolation interval in accordance with the position of the interpolation value which is currently to be calculated within the current interval.

4. Method according to claim 1, further comprising the step of calculating each weight coefficient for the current video line of a current interval recursively from each weight coefficient of the preceding, neighbouring video line on the screen, in which either incrementation of a weight coefficient, addition of an incremented summand or addition of a decremented summand is carried out.

5. Apparatus for obtaining correction values for video lines of a video frame having a computing unit for calculating convergence correction values for the video lines of a video frame in a video projection device, by means of interpolation between original convergence correction values stored in a memory unit, the apparatus comprising:

the computing unit having computing and selection means which, during the calculation of the correction value for a current video line, calculate a respective set of two intermediate or final values, one intermediate or final value being applicable to the current video line of a first field and the other intermediate or final value being applicable to the corresponding video line of a second field of the video frame, and which in each case select that intermediate or final value for the correction which is applicable to the current video line of the current field;

the computing unit having further computing means which, during the interpolation, calculate correction step values and perform a weighted combination of correction step values; and, the further computing means effecting, in order to calculate a correction step value for a respective interval bounded by two original values, linear interpolation between the original values, and using, in order to calculate the correction values in a current interval, not only the correction step value for the current interval but also at least the correction step value of a preceding and/or succeeding interval.

6. Apparatus according to claim 5, wherein the computing means calculate weight coefficients to provide weighting in accordance with the position of the current video line within the current interval.

7. Apparatus according to claim 5, in which a line counter is provided as the selection means and decides, on the basis of its current counter reading, which intermediate or final value is to be used for the current video line during the correction.

8. Apparatus for obtaining correction values for video lines of a video frame having a computing unit for calculating correction values for the video lines of a video frame, in particular for convergence correction in a video projection device, by means of interpolation between original values in which the original values are stored in a memory unit, the apparatus comprising:

the computing unit having computing and selection means which, during the calculation of the correction value for a current video line, calculate a respective set of two intermediate or final values, one intermediate or final value being applicable to the current video line of a first field and the other intermediate or final value being applicable to the corresponding video line of a second field of the video frame, and which in each case select that intermediate or final value for the correction which is applicable to the current video line of the current field; and, in each case during the calculation of the correction value, the computing means calculating weight coefficients for two neighbouring video lines on the screen together, one of the two neighbouring video lines belonging to a first field of the video frame and the other belonging to a second field of the video frame.

* * * * *